US008587893B2

(12) United States Patent
Kim et al.

(10) Patent No.: US 8,587,893 B2
(45) Date of Patent: Nov. 19, 2013

(54) BASE STRUCTURE FOR DEVICE HAVING A BASE BODY AND BASE REINFORCING PLATE AND HARD DISK DRIVE HAVING THE BASE STRUCTURE

(75) Inventors: Ju Ho Kim, Gyunggi-do (KR); Won Young Choi, Gyunggi-do (KR); Tae Young Choi, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 84 days.

(21) Appl. No.: 13/067,102

(22) Filed: May 9, 2011

(65) Prior Publication Data

US 2011/0317310 A1    Dec. 29, 2011

(30) Foreign Application Priority Data

Jun. 28, 2010  (KR) .................. 10-2010-0061440

(51) Int. Cl.
*G11B 33/02*    (2006.01)
(52) U.S. Cl.
USPC ..................................................... 360/97.01
(58) Field of Classification Search
USPC .......... 360/97.01, 97.02, 98.07, 98.08, 99.04; 310/67 R
See application file for complete search history.

(56) References Cited

U.S. PATENT DOCUMENTS

| | | | | |
|---|---|---|---|---|
| 4,814,914 A * | 3/1989 | Hagiwara et al. | .......... | 360/98.08 |
| 5,414,574 A * | 5/1995 | Boutaghou et al. | ........ | 360/99.17 |
| 5,898,537 A * | 4/1999 | Oizumi et al. | ............. | 360/99.18 |
| 6,031,686 A * | 2/2000 | Konno et al. | .............. | 360/99.01 |
| 6,426,847 B1 * | 7/2002 | Dague et al. | ............... | 360/99.16 |
| 6,570,736 B2 * | 5/2003 | Noda | .......................... | 360/99.18 |
| 6,583,965 B1 * | 6/2003 | Forbord et al. | ............ | 360/294.4 |
| 6,982,850 B1 * | 1/2006 | Ying | .......................... | 360/97.16 |
| 7,012,781 B2 * | 3/2006 | Chee et al. | ................ | 360/99.19 |
| 7,546,669 B1 * | 6/2009 | Ying | .............................. | 29/430 |
| 7,633,709 B1 * | 12/2009 | Dobosz et al. | ............ | 360/97.13 |
| 7,760,464 B2 * | 7/2010 | Xu et al. | .................... | 360/99.16 |
| 7,974,041 B2 * | 7/2011 | Suzuki | ....................... | 360/99.16 |

(Continued)

FOREIGN PATENT DOCUMENTS

| | | |
|---|---|---|
| JP | 2000-298929 | 10/2000 |
| KR | 10-1999-0056329 | 7/1999 |
| KR | 10-2000-0020562 | 4/2000 |
| KR | 10-2005-0049663 | 5/2005 |

OTHER PUBLICATIONS

Korean Office Action issued Jul. 27, 2011 in corresponding Korean Patent Application 10-2010-0061440.

*Primary Examiner* — Angel Castro

(57) ABSTRACT

There are provided a base structure for a device such as a hard disk drive and a hard disk drive having the same. The base structure includes: a base body including components mounted thereon and made of a non-aluminum material; and a base reinforcing part attached to the base body as an additional piece. More specifically, the base body is provided by press-molding a steel sheet and the base reinforcing part is provided by press-molding a steel sheet or is provided as a reinforcing plate separately attached to an outer surface of the base body, and the base structure further includes a reinforcing part processing member additionally provided in the reinforcing plate. The base structure for a device such as a hard disk drive and the like, in which the rigidity thereof is secured or the weight thereof is reduced by using various base reinforcing parts and reinforcing part processing members while the manufacturing costs of the base structure are reduced.

3 Claims, 9 Drawing Sheets

(56) References Cited

U.S. PATENT DOCUMENTS

| | | |
|---|---|---|
| 2005/0111134 A1 | 5/2005 | Byun et al. |
| 2006/0146442 A1* | 7/2006 | Ser et al. .................... 360/97.01 |
| 2006/0221494 A1* | 10/2006 | Katsumata et al. ........ 360/97.01 |
| 2010/0238590 A1* | 9/2010 | Tashiro et al. ............. 360/99.08 |

* cited by examiner

BASE STRUCTURE FOR DEVICE HAVING A BASE BODY AND BASE REINFORCING PLATE AND HARD DISK DRIVE HAVING THE BASE STRUCTURE

CROSS-REFERENCE TO RELATED APPLICATIONS

This application claims the priority of Korean Patent Application No. 10-2010-0061440 filed on Jun. 28, 2010, in the Korean Intellectual Property Office, the disclosure of which is incorporated herein by reference.

BACKGROUND OF THE INVENTION

1. Field of the Invention

The present invention relates to a base structure for a device such as a hard disk drive, and a hard disk drive having the same, and more particularly, to a base structure for a device and a hard disk drive having the same in which the rigidity of the base structure is secured and the weight thereof is reduced with various base reinforcing parts and reinforcing part processing members while the manufacturing costs of the base structure for the device such as the hard disk drive are reduced.

2. Description of the Related Art

Since a known hard disk drive, as a device recording data on a disk or reproducing data stored on the disk by using a read/write head, can access mass data at high speed, the hard disk drive is a component that is widely used as an auxiliary storage device of a computer system, and the like.

The hard disk drive has been increased in capacity by the implementation of high tracks per inch (TPI) and high bits per inch (BPI) and the domain of the applications thereof has also been extended in recent years.

For example, a compact hard disk drive which can be used in portable electronic apparatuses, such as a notebook computer, a PDA, a cellular phone, and the like, has been actively developed. A hard disk drive having a diameter of 2.5 inches has been developed to be applied to a notebook computer and the like, while a 0.85 inch hard disk drive, smaller than the 2.5-inch hard disk drive, has been practicalized in the field of cellular phones, MP3 players and the like.

For example, in FIG. 1, a known hard disk drive 100 is shown.

That is, as shown in FIG. 1, the known hard disk drive 100 includes a base 200 on which various components are mounted and a cover (not shown) attached to the base, a spindle motor 130 installed in a motor supporting portion (not denoted by a reference numeral, see 14 of FIG. 2) of the base to rotate a data processing magnetic disk 110, and an actuator assembly 150 provided as an actuator 154 rotatably coupled to an actuator pivot 152 installed at a pivot supporting portion 152a provided in the base to move a read/write head (not denoted by a reference numeral) onto a recording surface of the disk.

Meanwhile, the base 200 of the known hard disk drive 100 is manufactured by using a material of which a chief element is aluminum in a die casting process. Therefore, since the base 200 of the known hard disk drive is manufactured by using aluminum as the chief element thereof in the die casting process, the base 200 may have high manufacturing costs.

Meanwhile, as the hard disk drive used in the portable electronic apparatuses, such as a notebook computer, a PDA, a cellular phone, and the like, a micro hard disk drive is required due to the recent trend for light, thin, short, and small products. Therefore, securing the rigidity of the base while reducing the thickness or weight of the base has been required.

For example, although not shown in the figure, a reinforcing rib (not shown) formed by the protrusion of a part of the base onto an inner surface or an outer surface of the base is provided while manufacturing the base through the die casting process in the related art in order to secure the rigidity of the base.

However, in the case that the protruded reinforcing rib is integrally provided in the base of the hard disk drive made of the material of which the chief element is aluminum, while the manufacturing costs thereof may be relatively inexpensive, they may be further increased, and since the known reinforcing rib is integrally formed in the base, the weight of the base itself may be increased in order to improve the rigidity of the base.

Accordingly, the applicant of the present invention has proposed a base structure for a device of the present invention in which a base structure is manufactured by pressing a metal sheet of which a chief element is steel, a less expensive material than aluminum, while a base reinforcing part for securing rigidity is attached as an additional piece, in particular, appropriate rigidity can be secured while preventing an increase in the overall weight of the base structure by the base reinforcing part.

SUMMARY OF THE INVENTION

An aspect of the present invention provides a base structure for a device such as a hard disk drive and the like, in which the rigidity thereof is secured or the weight thereof is reduced by using various base reinforcing parts and reinforcing part processing members while the manufacturing costs of the base structure are reduced, and a hard disk drive having the same.

According to an aspect of the present invention, there is provided a base structure for a device, the base structure including: a base body including components mounted thereon and made of a non-aluminum material; and a base reinforcing part attached to the base body as an additional piece.

The base body may be provided by press-molding a steel sheet, and the base reinforcing part may be provided by press-molding a steel sheet or be provided as a reinforcing plate separately attached to an outer surface of the base body, and the base structure may further include a reinforcing part processing member additionally provided in the reinforcing plate.

The reinforcing plate may be formed as a circular reinforcing plate disposed to surround a motor supporting portion provided in the base body.

The reinforcing part processing member provided in the base reinforcing part which is the reinforcing plate may include at least one of a cut portion and a hole formed in the reinforcing plate to enable a weight reduction or asymmetric reinforcement of the reinforcing plate.

Alternatively, the reinforcing part processing member provided in the base reinforcing part which is the reinforcing plate may include at least one of a step portion and a concave-convex portion integrally provided to increase rigidity of the reinforcing plate itself.

The base body may be provided by press-molding a steel sheet and the base reinforcing part may be provided by press-molding a steel sheet or be provided as a reinforcing disk attached to an outer surface of the base body and including a motor supporting portion reinforcing portion provided to reinforce a motor supporting portion provided in the base body.

The reinforcing disk may include divided unit reinforcing disks, and the unit reinforcing disks may have different thicknesses or include holes as reinforcing part processing members in order to adjust weight or rigidity.

The components mounted on the base body may include a magnetic disk, a spindle motor attached to a motor supporting portion of the base body to drive the magnetic disk, and an actuator assembly disposed at a side of the magnetic disk in order to process disk data, for use in a hard disk drive.

According to another aspect of the present invention, there is a hard disk drive including: the base structure as described above; a magnetic disk mounted on the base structure; a spindle motor attached to a motor supporting portion of the base structure to drive the magnetic disk; and an actuator assembly disposed at a side of the magnetic disk in order to process disk data.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
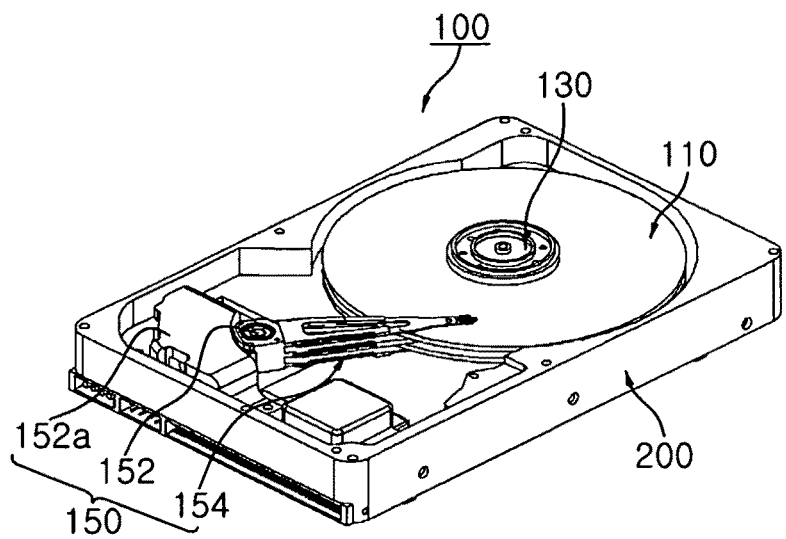
FIG. 1 is a schematic perspective view of a known hard disk drive.

Exemplary embodiments of the present invention will now be described in detail with reference to the accompanying drawings.

First, as described above, the base (200 of FIG. 1) of the known hard disk drive (100 of FIG. 1) is manufactured through a die casting process using aluminum as a chief element thereof.

Contrary to this, as described in detail below, a base structure 1 for a device, e.g., a base structure 1 for a hard disk drive according to an exemplary embodiment of the present invention is manufactured through a pressing process using a steel sheet of which a chief element is steel, a less expensive metal than aluminum.

Therefore, the base structure 1 for the device according to the exemplary embodiment of the present invention is lower in manufacturing costs, but in the case of a base structure of the same size, weaker in rigidity and larger in weight than the base (200 of FIG. 2) manufactured by a die casting process in which a chief element is aluminum.

For example, the densities of aluminum and steel (iron) are 2,700 kg/m$^3$ and 78,850 kg/m$^3$, respectively, and the elastic moduli of aluminum and steel (iron) are 68,000 MPa and 200,000 MPa, respectively, on the basis of a known physical property value.

Accordingly, since the steel sheet which is the chief material of the base structure 1 for the device according to the exemplary embodiment of the present invention has a high level of density and a high elastic modulus, materials such as SPCC, SPCE, and the like may be used, and in the case of a pressing process, since the materials are molded through pressing using a mold, a steel sheet having a thickness of 1.0 mm or less may be used as a material in order to accurately mold the base structure.

Further, in order to reduce the manufacturing cost of the base of which the chief element is aluminum, in the case in which the base structure is manufactured by using the steel sheet, the base structure may have lower rigidity than the known die-casted aluminum base (200 of FIG. 1).

For example, when a steel sheet of a thick material is press-molded, the rigidity of the base structure 1 increases; however, a unit weight of the base structure 1 increases and precision molding of the pressing molding requiring high shape accuracy becomes difficult.

Therefore, according to the exemplary embodiment of the present invention, in order to increase the rigidity of the base structure to maintain normal driving of the hard disk drive while reducing the weight of the base structure by substantially using a thin steel sheet (a steel sheet having a thin thickness) as the material of the base structure, the base structure further includes a base reinforcing part attached to a base body 10 as an additional piece.

Figure 2A:
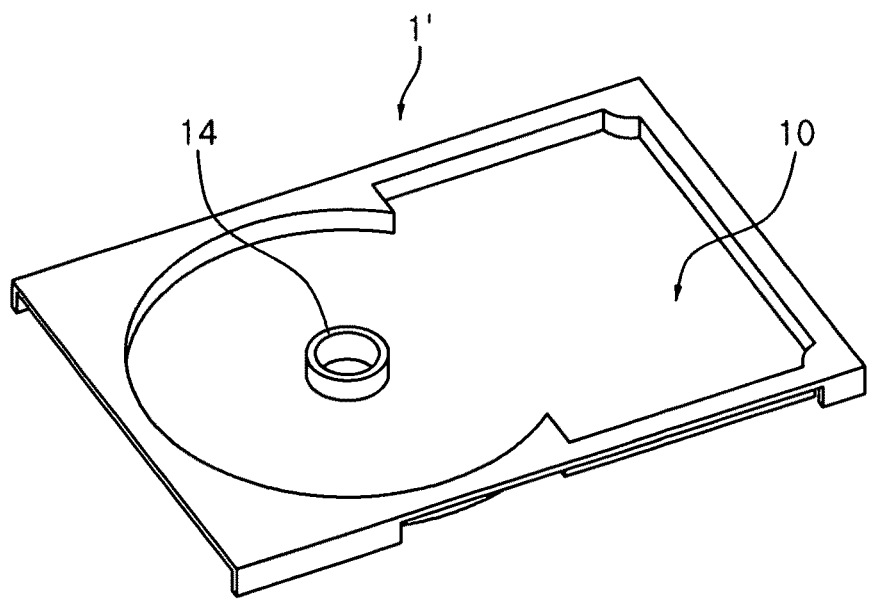
FIGS. 2A and 2B are top and bottom perspective views of a base structure for a device before attaching a base reinforcing part (reinforcing plate) thereto according to an exemplary embodiment of the present invention.
Figure 2B:
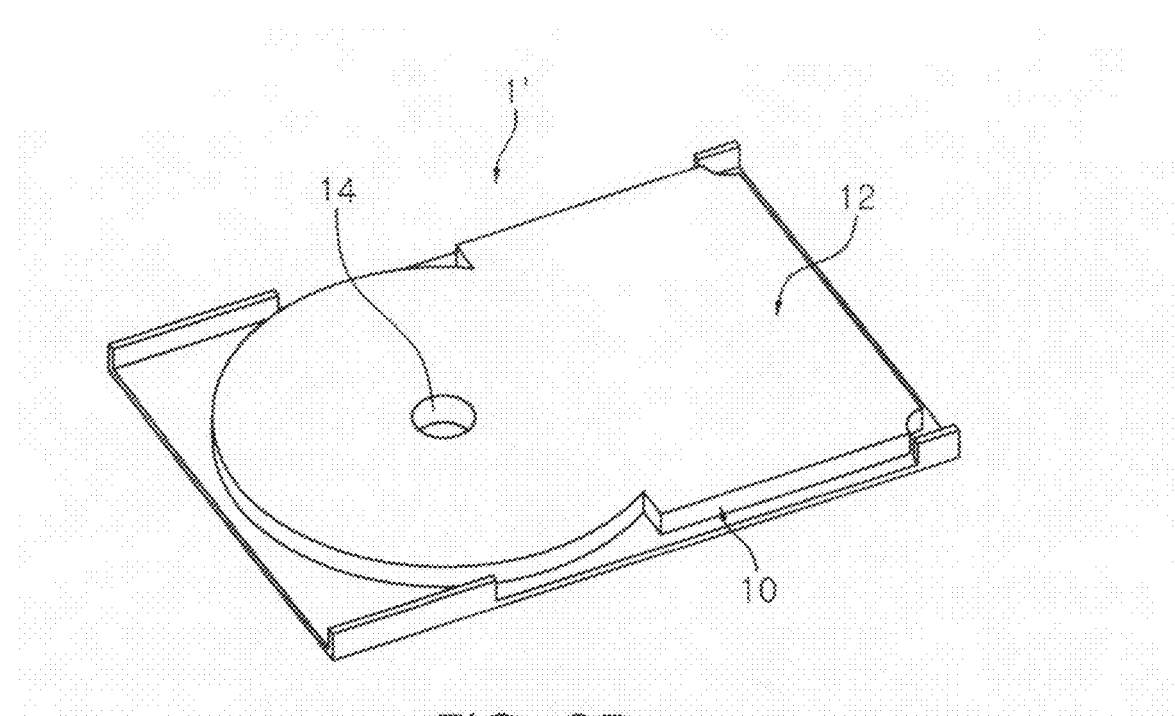

Meanwhile, FIGS. 2A and 2B show a base structure 1' that is press-molded with the steel sheet according to the exemplary embodiment of the present invention and does not include the base reinforcing part to be described in detail below, and the base structure basically includes the base body 10 where a motor supporting portion 14 is formed.

Figure 3:
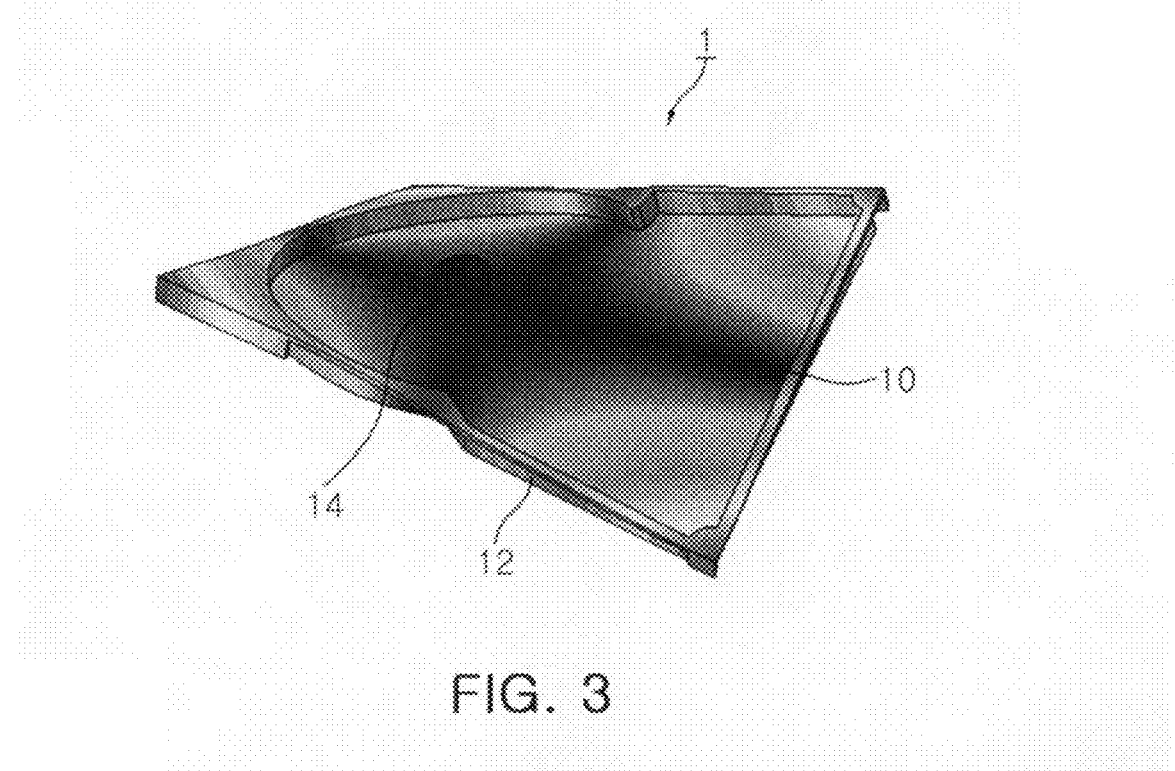
FIG. 3 shows a primary unique vibration mode of a base structure manufactured by using a steel sheet according to an exemplary embodiment of the present invention.

In addition, in FIG. 3, the base structure does not include the base reinforcing part according to the exemplary embodiment of the present invention of FIG. 2, but a primary unique vibration mode for the base structure 1' press-molded with the steel sheet is shown differently from the known base structure.

That is, as seen in FIG. 3, in the unique vibration mode of the base structure 1' of the hard disk drive, a mode having X-type torsional deformation is generated.

Next, in Table 1 below, the thicknesses of the steel sheet of the base structure 1' in which the steel sheet of FIG. 2 is press-molded are 0.7 mm and 0.6 mm, and unique vibrations for the base structure 1 for the device according to the exemplary embodiment of the present invention to be described below to which base reinforcing parts (i.e., circular reinforcing plates 30) having the forms of FIGS. 4A through 4C, attached as an additional piece, are compared with each other.

TABLE 1

Figure 4A:
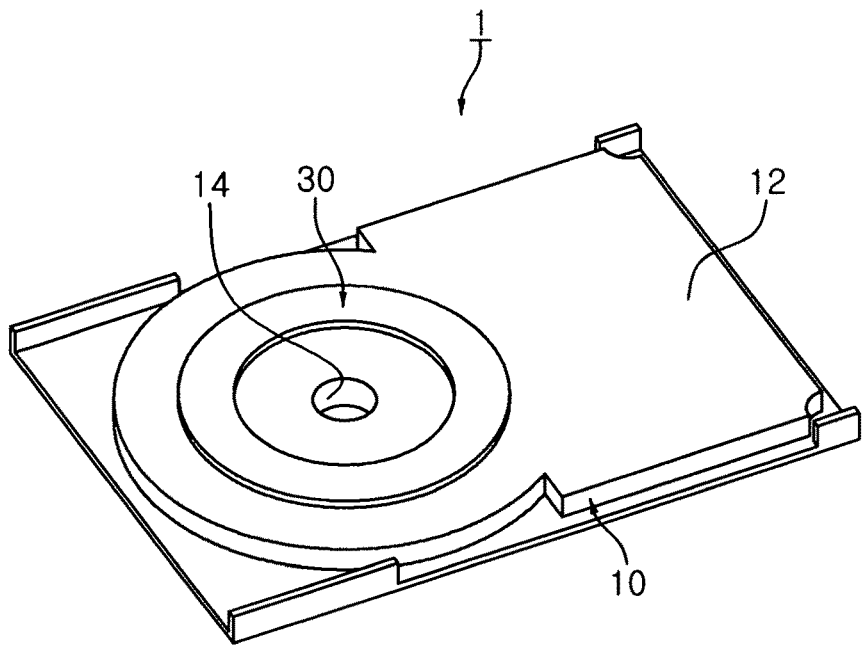
FIGS. 4A through 4E are perspective views and a cross-sectional view showing various forms of reinforcing plates and reinforcing part processing members as a base structure according to an exemplary embodiment of the present invention.
Figure 4B:
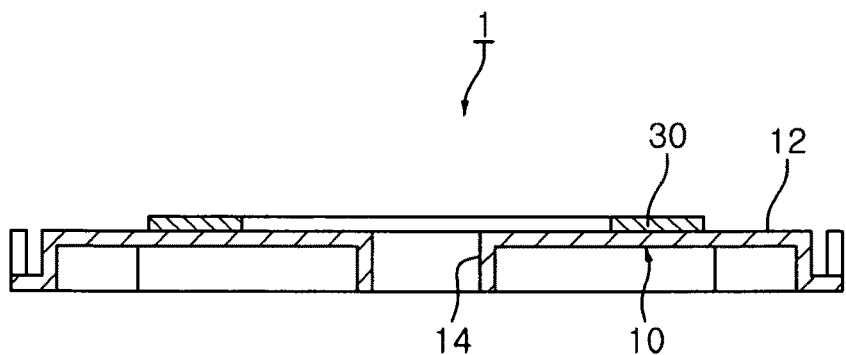
Figure 4C:
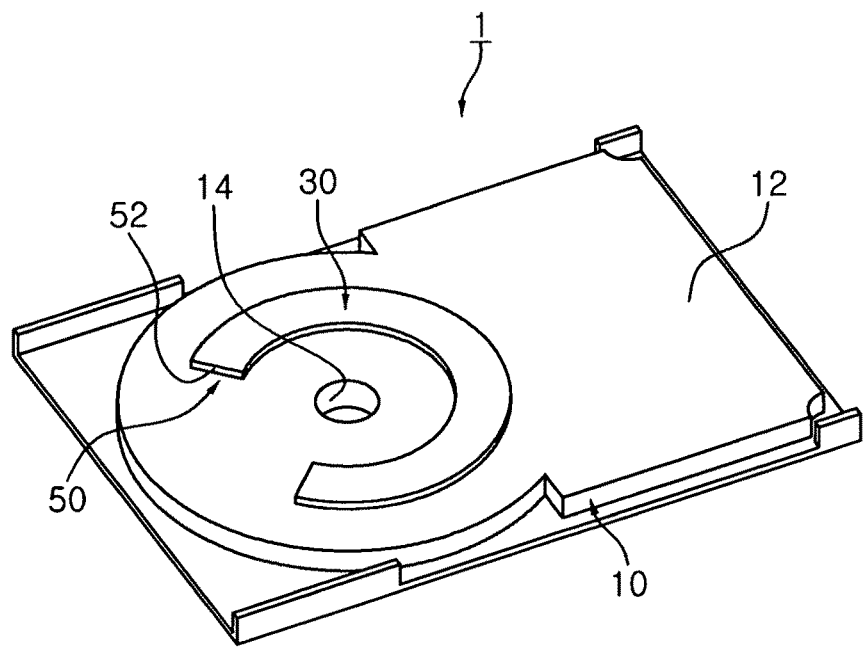

| Classification | Base structure 1 made of 0.7 mm steel sheet of FIG. 2 | Base structure 1 made of 0.6 mm steel sheet of FIG. 2 | Base structure 1 made of 0.6 mm steel sheet of FIG. 4A and having reinforcing plate 30 attached thereto | Base structure 1 made of 0.7 mm steel sheet of FIG. 4C and having partially cut reinforcing plate 30 attached thereto |
|---|---|---|---|---|
| Weight | 44 g | 39 g | 45 g | 44 g |
| Primary unique vibration frequency | 430 Hz | 382 Hz | 456 HZ | 440 Hz |

That is, as seen in Table 1 above, as compared with the base structure 1' without the base reinforcing part (reinforcing plate) as shown in FIG. 2, the base structure 1 having the base reinforcing part (reinforcing plate) attached thereto has an increased unique vibration frequency while having a weight of the same level by reducing the thickness of the steel sheet to have improved rigidity.

Meanwhile, the reinforcing plate 30 of the base reinforcing part according to the exemplary embodiment of the present invention described in detail below may be attached to a circumference of the motor supporting portion 14 as an outer surface 12 of the base body 10 in FIG. 2. The reinforcement of the circumference is required because the circumference of the motor supporting portion may be easily deformed by continuous vibration.

Meanwhile, the reinforcing plate 30, which is the base reinforcing part, may be attached to the outer surface 12 of the base body through bonding or laser- or spot-type welding. In Table 1, a unique vibration frequency value is calculated on the assumption that the base structure includes, for example, an epoxy bond adhesive layer having a thickness of 50 μm.

Hereinafter, the base structure 1 for the device, preferably, the base structure 1 for the hard disk drive 100 according to the exemplary embodiment of the present invention will be described with reference to FIGS. 4 through 7.

However, the mounted components of the general hard disk drive 100 described in the related art, which are mounted on the base structure 1 for the device according to the exemplary embodiment of the present invention, i.e., the magnetic disk 110, the spindle motor 130 for driving the magnetic disk, and the actuator assembly 150 for processing data on the magnetic disk will be described with the same reference numerals as shown in FIG. 1 and a detailed description thereof will be omitted in the exemplary embodiment.

First, as shown in FIGS. 4A and 4B, the above-mentioned mounted components 110, 130, and 150 are generally loaded on the base structure 1 for the device according to the exemplary embodiment of the present invention and in addition, the base structure 1 includes the base body 10 provided by press-molding a non-aluminum material, i.e., the steel sheet in order to reduce the manufacturing cost and a base reinforcing part attached to the base body 10 as an additional piece.

In the exemplary embodiment, the base body 10 is provided by press-molding the steel sheet and is low in manufacturing costs, but uses the base reinforcing part attached as the additional piece in order to reinforce the rigidity thereof instead of reducing weight by using a thin-plate metal for molding as compared with the known aluminum sheet.

In this case, the base reinforcing part of the exemplary embodiment is provided as the reinforcing plate, more preferably, the circular reinforcing plate 30 attached to the outer surface 12 of the base body 10, and more preferably, the outer circumference of the motor supporting portion 14.

The base reinforcing part may be provided as reinforcing plates having different shapes such as a semicircular shape, a rectangular shape, and the like. However, the base reinforcing part will hereinafter be described as the circular reinforcing plate 30 in the exemplary embodiment.

The circular reinforcing plate 30 does not particularly need to be made of the same material as that of the base body 10, but the steel sheet is preferably provided as the thin plate through press-molding.

In addition, the circular reinforcing plate 30 according to the exemplary embodiment of the present invention may be attached to the outer surface 12 of the base body 10 in particular. For example, since the magnetic disk 110 rotates at a high speed while being mounted on the spindle motor 130 mounted on the motor supporting portion 14 in the base structure 1 according to the exemplary embodiment of the present invention as shown in FIG. 1, the circular reinforcing plate 30 according to the exemplary embodiment of the present invention may be attached to the outer surface 12 of the base body 10 in order to achieve a smooth flow in an internal air flow field.

Furthermore, since foreign objects need to be prevented from being introduced into the hard disk drive 100 in order to prevent errors in data processing, i.e., data reading/writing as shown in FIG. 1, the base reinforcing part, the circular reinforcing plate 30 is attached to the inside of the hard disk drive in order to prevent data errors from occurring in the hard disk drive due to foreign objects generated during bonding or welding.

In addition, as described above, the circular reinforcing plate 30 according to the exemplary embodiment of the present invention is most preferably attached to the outer surface 12 of the base body 10 to surround the circumference of the motor supporting portion 14.

That is, as shown in FIG. 3, since the X-type mode is formed around the motor supporting portion in consideration of the primary unique vibration frequency mode, and deformation may be most easily produced around the motor supporting portion 14 to which the spindle motor 130 is assembled in the base body. Therefore, the rigidity of the base body 10 is secured by surrounding the circumference of the motor supporting portion 14 with the circular reinforcing plate 30.

Figure 4D:
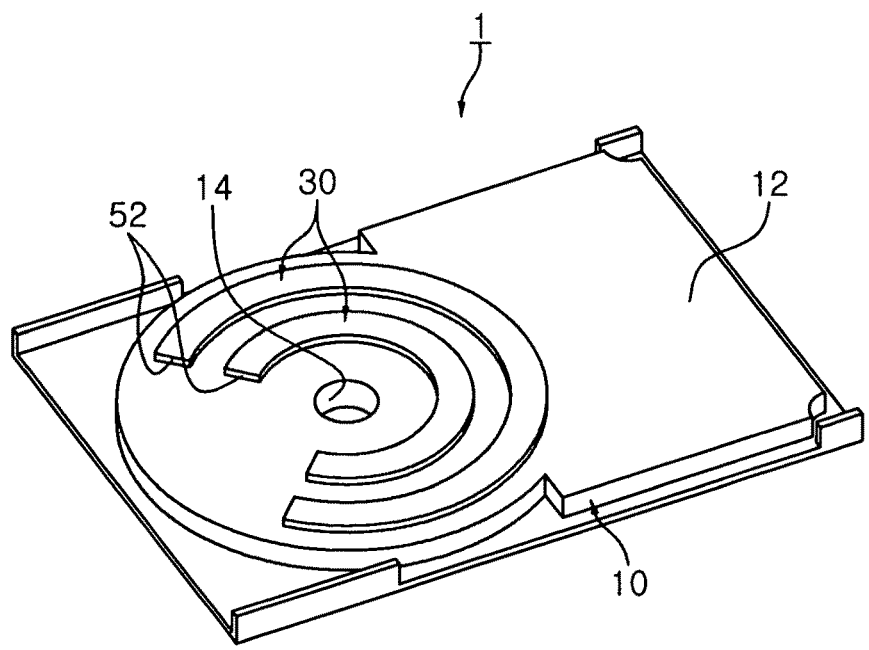
Figure 4E:
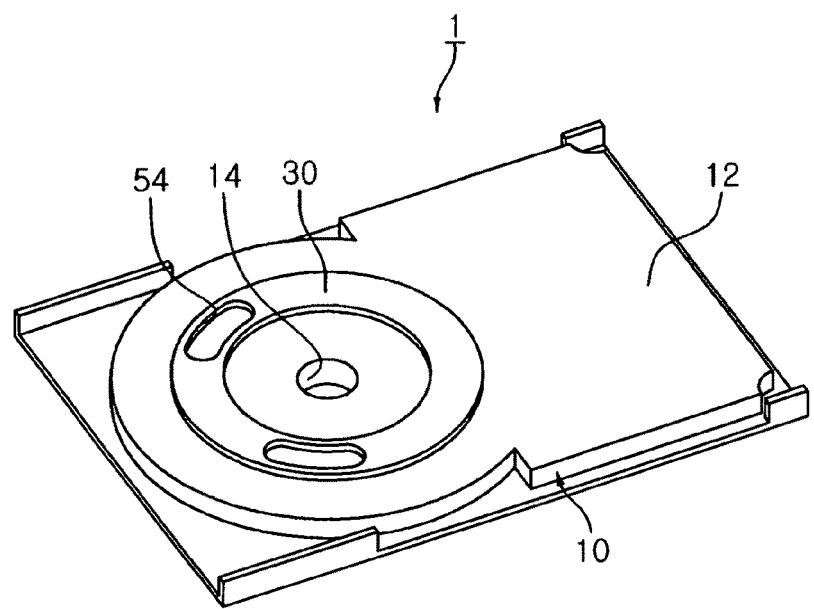

Next, as shown in FIGS. 4C through 4E, the base structure 1 according to the exemplary embodiment of the present invention further includes a reinforcing part processing member 50 in addition to the circular reinforcing plate 30.

That is, the base body 10 and the base reinforcing part, i.e., the circular reinforcing plate 30 of the base structure 1 according to the exemplary embodiment of the present invention are provided by press-molding a thin steel sheet having a thickness of 1.0 mm or less. Since the steel sheet material is larger than the known aluminum material in weight, the reinforcing part processing member 50 according to the exemplary embodiment of the present invention is provided in the circular reinforcing plate to enable a weight reduction or asymmetric reinforcement of the reinforcing plate and specifically, may include a cut portion 52 of FIGS. 4C and 4D or a hole 54 of FIG. 4E provided in the circular reinforcing plate 30.

Therefore, as shown in FIGS. 4C and 4D, when a part of one or two circular reinforcing plates is cut and attached to the outer surface of the base body around the motor supporting portion 14, the rigidity of (the motor supporting portion) of the base body is reinforced while a weight of the reinforcing plate itself is reduced, as a result, the weight of the entire base structure can be reduced.

In this case, the cut portion 52 of the reinforcing part processing member 50 implements asymmetry in a reinforcing plate attachment portion to allow for the reinforcement of a desired portion. That is, the weight may be reduced by as much as possible by reinforcing only a desired portion.

Alternatively, as shown in FIG. 4E, the weight of the reinforcing plate itself may be reduced while implementing reinforcement by forming the hole 54 of the reinforcing part processing member 50 in the circular reinforcing plate 30.

In addition, since the rigidity of the reinforcing plate itself is changed depending on the position of the hole 54, asymmetric rigidity may be implemented.

However, since the base structure and the reinforcing plate according to the exemplary embodiment of the present invention are manufactured by molding the steel sheet, the base structure is larger than the known aluminum base structure in weight, and as a result, the reinforcing part processing member is used to reduce the weight of the entire base structure or enable asymmetric reinforcement. The known aluminum base (200 of FIG. 1) is not much greater than the steel sheet in terms of weight and a reinforcing rib is not attached to the base as an additional piece but is integrally formed with the base, and as a result, the known aluminum base will not require the reinforcing part processing member itself according to the exemplary embodiment of the present invention.

Next, FIGS. 5 and 6 show other modified examples of the reinforcing part processing member 50 provided in the base reinforcing part, i.e., the circular reinforcing plate 30 according to the exemplary embodiment of the present invention.

Figure 5A:
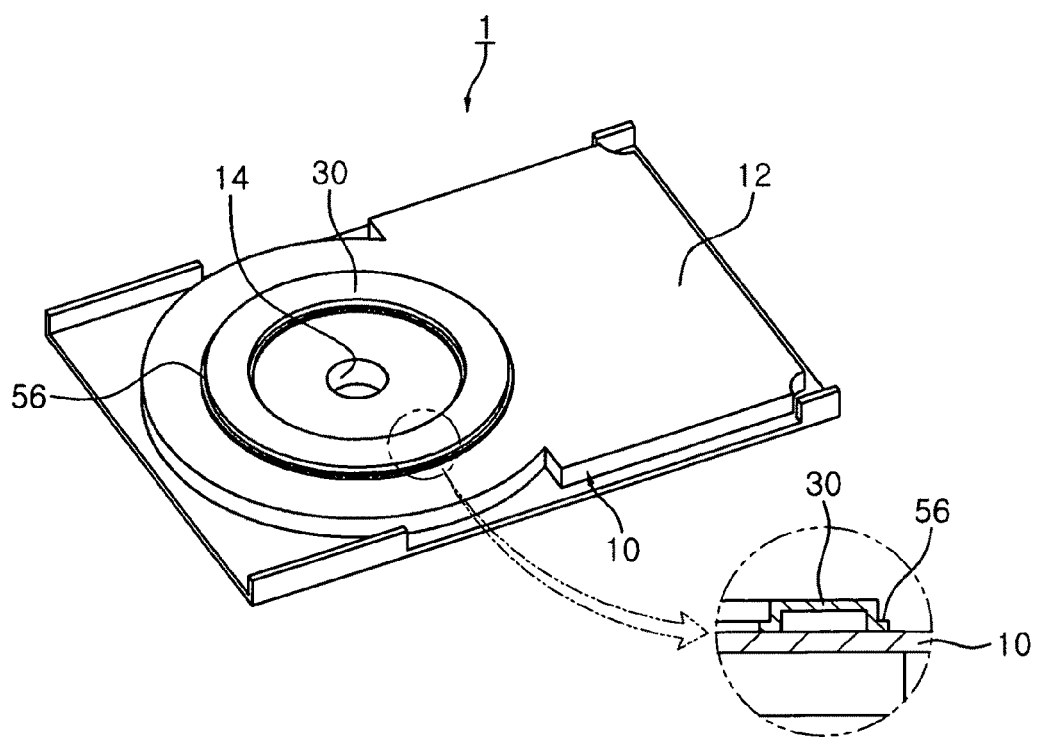
FIGS. 5A through 5C are perspective views showing other modified examples of a reinforcing part processing member according to an exemplary embodiment of the present invention.
Figure 5B:
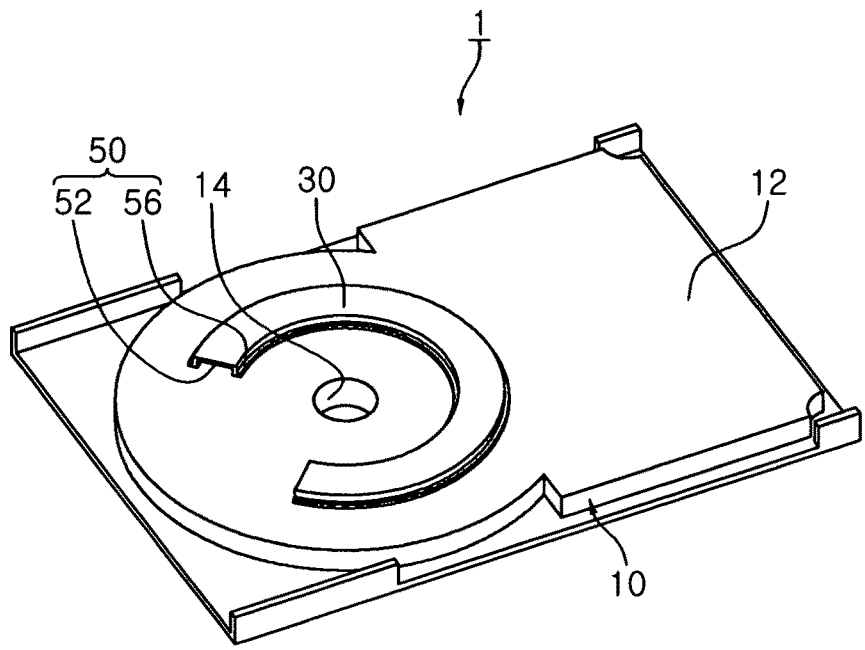
Figure 5C:
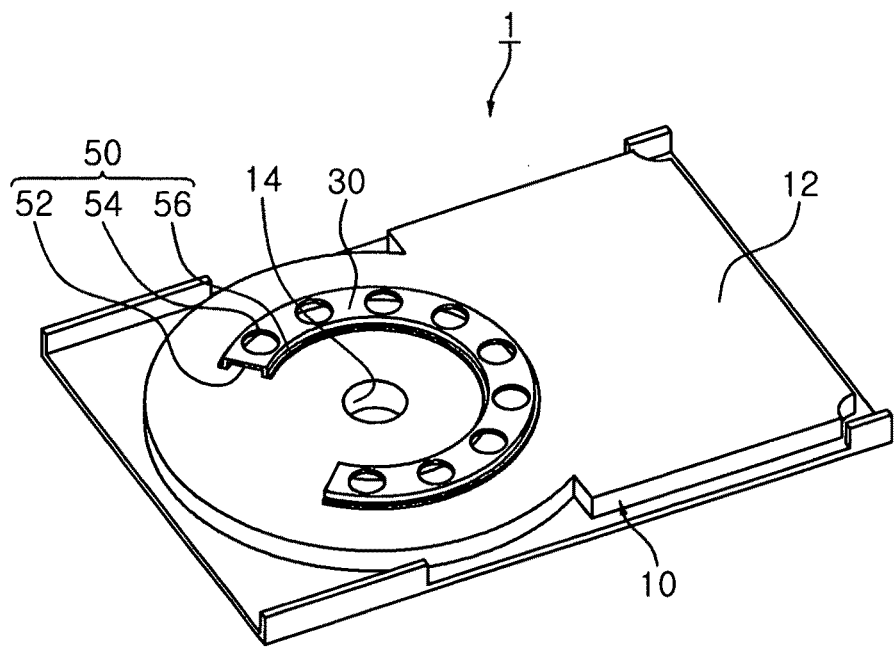

That is, as shown in FIGS. 5A through 5C, the reinforcing part processing member 50 according to the exemplary embodiment of the present invention may include at least one step portion 56 integrally provided to increase the rigidity of the circular reinforcing plate.

The step portion 56 according to the exemplary embodiment of the present invention may be integrally formed on both the inner circumference and the outer circumference of the circular reinforcing plate 30 and the step portion increases the rigidity of the reinforcing plate because the bent step portion is formed in the flat reinforcing plate.

In addition, as shown in FIG. 5B or 5C, by forming the cut portion 52 or the hole 54 which is another type reinforcing part processing member described in FIG. 4 in the reinforcing plate including the reinforcing part processing member of the step portion 56, the rigidity of the reinforcing plate may be reinforced while reducing the weight of the reinforcing plate itself.

In this case, the reinforcing plate including the step portion 56 of FIG. 5 will be an attachment surface to which the step portion is attached (bonded or welded) to the outer surface of the base body and a small gap may be formed between the reinforcing plate and the base body due to the step portion.

Figure 6A:
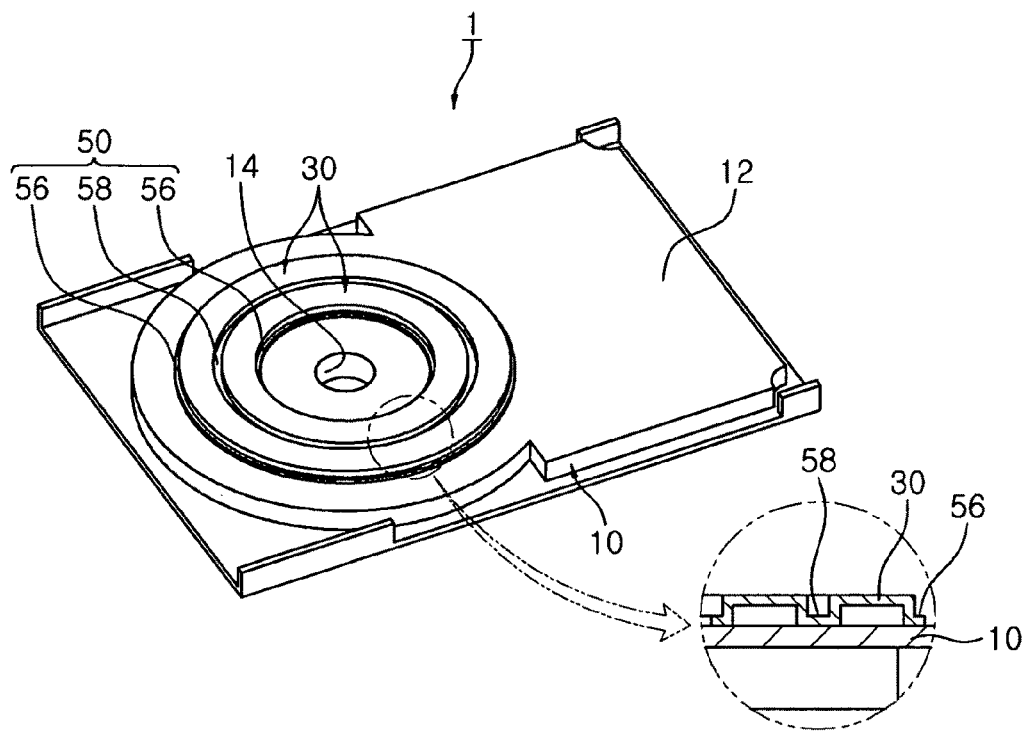
FIGS. 6A and 6B are perspective views showing another modified example of a reinforcing part processing member according to an exemplary embodiment of the present invention.
Figure 6B:
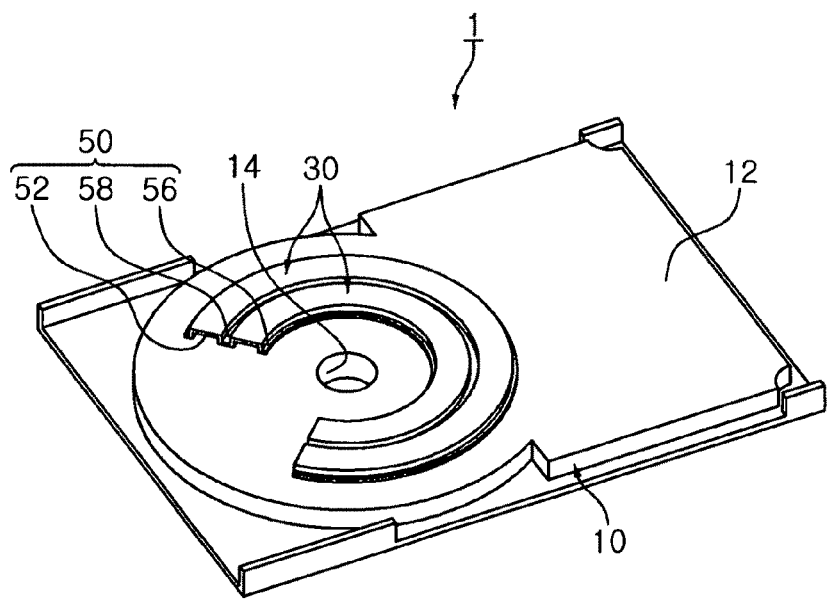

Next, as shown in FIGS. 6A and 6B, the base reinforcing part, i.e., the circular reinforcing plate 30 according to the exemplary embodiment of the present invention, for example, includes the reinforcing part processing member 50 of a concave-convex portion 58 at the center thereof to increase the rigidity of the reinforcing plate itself like the step portion of FIG. 5.

The concave-convex portion 58 is formed of one line in the figures; however, the concave-convex portion 58 is not limited thereto and may be formed of a plurality of lines.

Alternatively, as shown in FIG. 6B, the concave-convex portion 58 may include the step portion 56 and the cut portion 52 or a hole (not shown in FIG. 6B, see 54 of FIG. 5C).

In FIG. 6, the rigidity of the reinforcing plate itself can be increased by forming only the concave-convex portion 58 in the reinforcing plate 30.

Consequently, the reinforcing part processing member 50 according to the exemplary embodiment of the present invention shown in FIGS. 5 and 6 may reduce the weight of the reinforcing plate itself through cutting a part of the base reinforcing part, i.e., the reinforcing plate or forming the hole in the reinforcing plate, and increase the rigidity of the reinforcing plate itself by forming the step portion and/or the concave-convex portion in the reinforcing plate.

Accordingly, the base body 10 according to the exemplary embodiment of the present invention manufactured by press-molding the steel sheet which is larger than the known aluminum in weight on the whole secures the rigidity by using the base reinforcing part, the reinforcing plate 30, and the base structure 1 according to the exemplary embodiment of the present invention maximally increases rigidity, in particular, rigidity around the motor supporting portion, while maximally reducing weight through the reinforcing part processing member that reduces the weight of the reinforcing plate itself and increases the rigidity of the reinforcing plate.

Figure 7A:
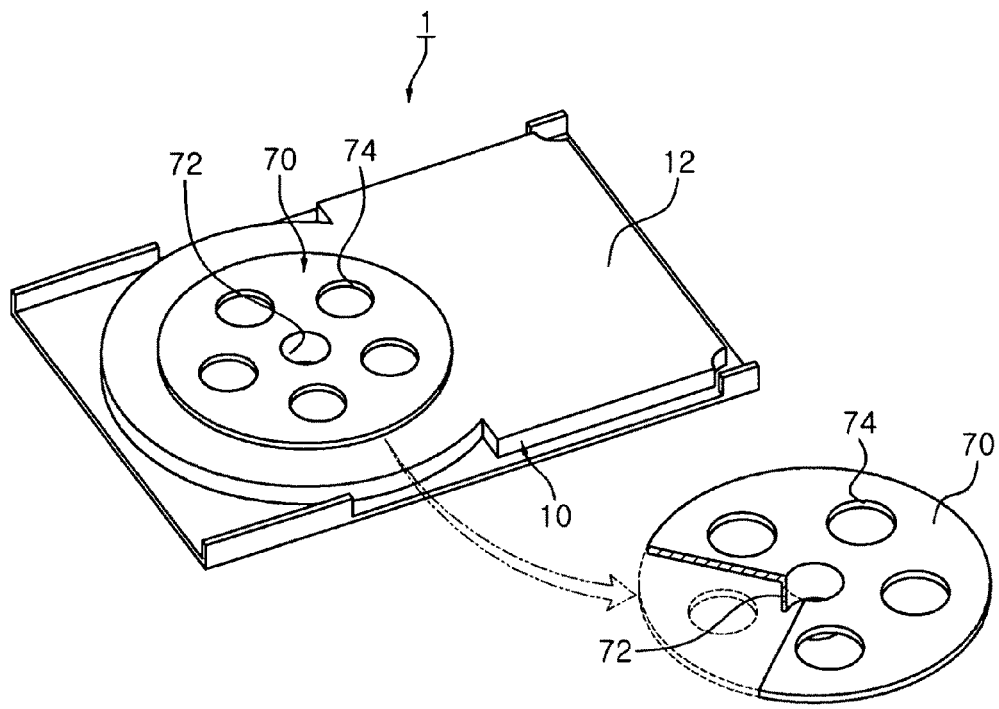
FIGS. 7A through 7C are perspective views and a cross-sectional view showing another modified example of a reinforcing part processing member according to an exemplary embodiment of the present invention.
Figure 7B:
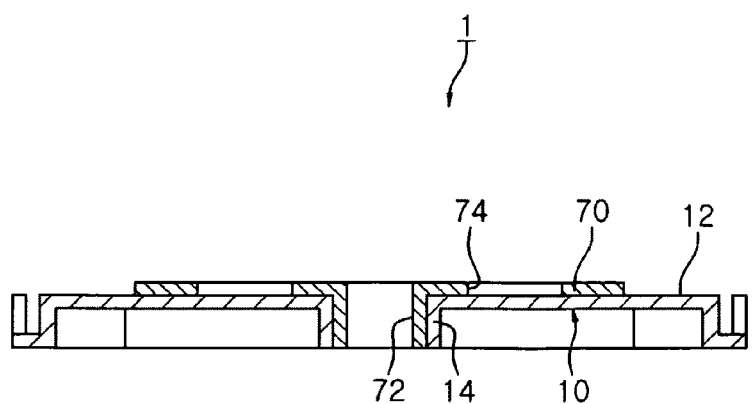

Next, FIGS. 7A and 7B show another modified example of a base reinforcing part according to an exemplary embodiment of the present invention.

That is, as shown in FIGS. 7A and 7B, the base reinforcing part according to the exemplary embodiment of the present invention may be provided as a reinforcing disk 70 including a motor supporting portion reinforcing portion 72 that can reinforce the motor supporting portion 14 provided in the base body 10.

In the reinforcing disk 70, a cylindrical portion, which is the motor supporting portion reinforcing portion 72, inserted into and attached to the motor supporting portion 14 of the base body, is integrally formed at the center thereof, and the circumference of the reinforcing disk 70 is attached (bonded or welded) to the outer surface 12 of the base body 10.

Accordingly, the reinforcing disk increases the rigidities of the motor supporting portion of the base structure and the base body around the motor supporting portion.

In this case, the reinforcing disk 70 may include holes 74 in order to reduce the weight thereof as described above.

Figure 7C:
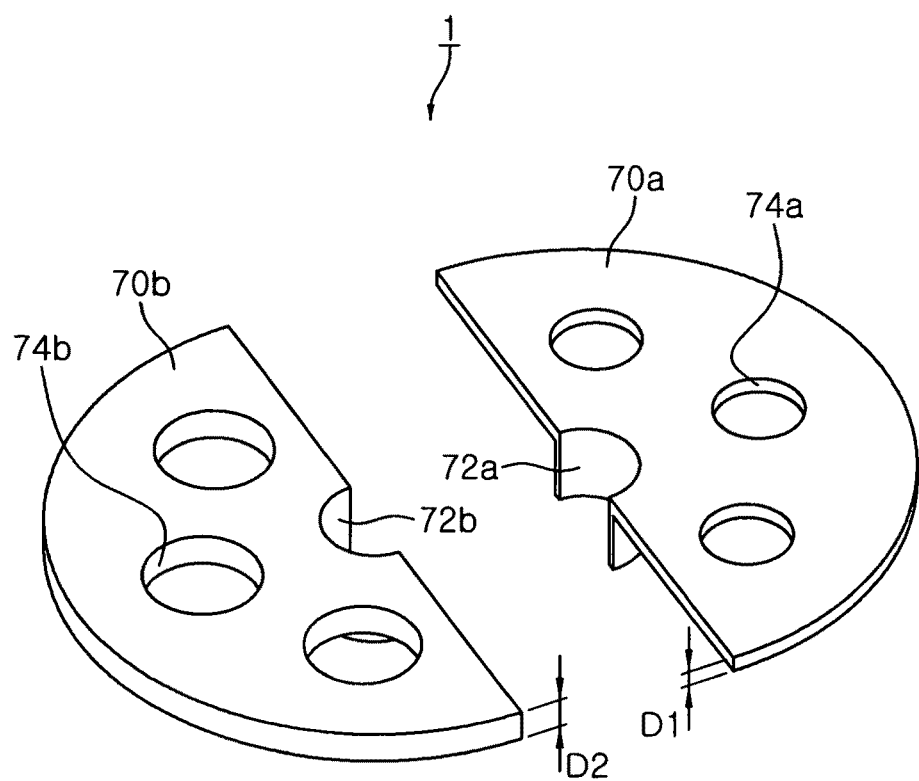

More preferably, as shown in FIG. 7C, the reinforcing disk 70, another type of base reinforcing part of the present invention, is constituted of two divided unit reinforcing disks 70a and 70b. When the thicknesses D1 and D2 of the unit reinforcing disks 70a and 70b are different from each other or the inner diameters of holes 74a and 74b are different from each other, the rigidities or weights of the divided unit reinforcing disks 70a and 70b may also be adjusted to be different.

In this case, reference numerals 72a and 72b represent the dividing of the motor supporting portion reinforcing portion.

Accordingly, the reinforcing disk of FIG. 7C is appropriate to reinforce predetermined portions of the base body 10 to have different rigidities, and since the reinforcing disk of FIG. 7 is larger than the circular reinforcing plates of FIGS. 5 and 6 in area of attachment to the base body, the reinforcing plate further facilitates an increase of rigidity but increases the weight, and as a result, the reinforcing disk may be thinner than the circular reinforcing plates.

In this case, an inner diameter of the motor supporting portion 14 of the base body 10 may be adjusted to be larger than the thickness of the motor supporting portion reinforcing portion 72 of the reinforcing disk according to the exemplary embodiment of the present invention. The specification of the spindle motor attached to the motor supporting portion may thereby be determined.

Meanwhile, the hard disk drive 100 including the base structure 1 according to the exemplary embodiment of the present invention may be provided.

That is, as described above, since the base structure 1 according to the exemplary embodiment of the present invention increases the rigidity of the base body, in particular, around the motor supporting portion of the base body, the base structure 1 maintains the rigidity like the known aluminum base while reducing the weight through the molding of the thin plate even if the base structure is manufactured by press-molding the steel sheet which is cheaper than the known aluminum, and as a result, an optimal hard disk drive which is cheaper and is not easily deformed can be provided.

As set forth above, although a known base of a hard disk drive, made of aluminum, is manufactured by using a thin steel sheet which is low in a manufacturing cost, an appropriate weight is maintained while rigidity is secured by providing various forms of base reinforcing parts.

In particular, various forms of reinforcing part processing members that implement additional rigidity improvement or appropriate weight maintenance (adjustment) of the base reinforcing part itself are provided, such that an optimal base structure is provided by molding the thin steel sheet through a press-molding process.

Accordingly, while decreasing a manufacturing cost of a device in which components are loaded on the base structure, e.g., a hard disk drive, the rigidity or weight of the device can be maintained under optimal conditions.

While the present invention has been shown and described in connection with the exemplary embodiments, it will be apparent to those skilled in the art that modifications and variations can be made without departing from the spirit and scope of the invention as defined by the appended claims.

What is claimed is:

1. A base structure for a device, the base structure comprising:
   a base body including a motor supporting portion for a spindle motor therein and including components mounted thereon and made of a non-aluminum material; and
   a base reinforcing part attached to the outer surface of the motor supporting portion as an additional piece in order to increase the rigidity of the base body,
   wherein the base body is provided by press-molding a steel sheet,
   the base reinforcing part is provided by press-molding a steel sheet or is provided as a reinforcing disk attached to an outer surface of the base body and including a motor supporting portion reinforcing portion provided to reinforce the motor supporting portion,
   the reinforcing disk includes divided unit reinforcing disks, and
   the unit reinforcing disks have different thicknesses or include holes as reinforcing part processing members in order to adjust weight or rigidity.

2. The base structure of claim 1, wherein the components mounted on the base body include a magnetic disk, a spindle motor attached to a motor supporting portion of the base body to drive the magnetic disk, and an actuator assembly disposed at a side of the magnetic disk in order to process disk data, for use in a hard disk drive.

3. A hard disk drive, comprising:
   the base structure of claim 1;
   a magnetic disk mounted on the base structure;
   a spindle motor attached to a motor supporting portion of the base structure to drive the magnetic disk; and
   an actuator assembly disposed at a side of the magnetic disk in order to process disk data.

* * * * *